United States Patent
Burke (10) Patent No.: US 6,655,659 B2
(45) Date of Patent: Dec. 2, 2003

(54) ONE-PIECE SANITARY SEAT RING (75) Inventor: Joseph Burke, Lee, NH (US)

(73) Assignee: Fisher Controls International Inc., Marshalltown, IA (US)

( * ) Notice: Subject to any disclaimer, the term of this patent is extended or adjusted under 35 U.S.C. 154(b) by 107 days.

(21) Appl. No.: 10/071,498

(22) Filed: Feb. 8, 2002

(65) Prior Publication Data
US 2003/0151017 A1 Aug. 14, 2003

(51) Int. Cl.[7] .................................................. F16K 5/00
(52) U.S. Cl. ........................................ 251/314; 251/316
(58) Field of Search ................................. 251/314, 316, 251/317, 317.01

(56) References Cited

U.S. PATENT DOCUMENTS

| | | | |
|---|---|---|---|
| 3,199,528 A | | 8/1965 | Oetjens ................ 137/329.01 |
| 4,248,403 A | * | 2/1981 | Scull ............................ 251/85 |
| 4,505,454 A | * | 3/1985 | Siepmann .................... 251/367 |
| 4,735,480 A | * | 4/1988 | Levinson et al. ............. 385/60 |
| 5,215,117 A | * | 6/1993 | Petersen et al. .......... 137/512.3 |
| 5,964,250 A | * | 10/1999 | Mueller ....................... 138/109 |

FOREIGN PATENT DOCUMENTS

| | | |
|---|---|---|
| DE | 20 14 237 A | 10/1971 |
| EP | 0 350 017 A1 | 1/1990 |
| FR | 1 529 484 A | 6/1968 |
| FR | 2 571 464 | 4/1986 |
| WO | WO 97/47904 A2 A3 | 12/1997 |

* cited by examiner

Primary Examiner—Paul J. Hirsch
(74) Attorney, Agent, or Firm—Lahive & Cockfield, LLP (57) ABSTRACT A sanitary eccentric seat ring and corresponding method of installation and adjustment is provided. The seat ring includes a body having a first section, a second section, and a body central axis passing through the first and second sections. A first bore is disposed within the first section, and has a first bore central axis concentric with the body central axis. A second bore is disposed within the second section, and has a second bore central axis eccentric to the body central axis. The first section is generally frusto-conical in shape. The second section is generally cylindrical in shape. The first bore within the first section is generally frusto-conical in shape, while the second bore of the second section is generally cylindrical in shape. The seat ring can further include a flange, or other end connection, disposed at one end of the first section. The flange is suitable for mounting the seat ring in a valve body. To install the seat ring into a valve body, the seat ring is placed in the valve body with a seal disposed to seal a gap between the seat ring and the valve body. The seat ring is rotated to adjust a central axis of an eccentric bore within the seat ring to align with a valve control element. The seat is removably and replaceably fastened into the valve body with at least one fastening mechanism, such that the at least one fastening mechanism is removed from a flow path through the valve and the seat ring.

21 Claims, 5 Drawing Sheets

ONE-PIECE SANITARY SEAT RING

FIELD OF THE INVENTION

The present invention relates to a seat ring for a valve, and more particularly to an offset or eccentric seat ring for a sanitary plug valve.

BACKGROUND OF THE INVENTION

Conventional control valves are comprised of many different components. One component common to plug-type control valves is a seat ring. A seat ring primarily forms part of a flow passageway and is used in conjunction with a closure member to modify a rate of flow through the valve. In the case of a plug valve, the plug seats against the seat ring to halt or otherwise regulate flow through the valve.

In the food processing and bio-technical industries, it is common to employ valves and valve parts that promote sanitary conditions. For example, in the beer brewing industry, there are many applications for large sized sanitary control valves for brewing beer. Control valves often range from smaller sizes of one to two inches, to larger sizes of four or six inches. One conventional type of sanitary control valve is a sanitary butterfly valve. However, conventional butterfly valves have difficulty controlling fluids flowing therethrough, especially at low flow rates in large size valves.

Figure 1:
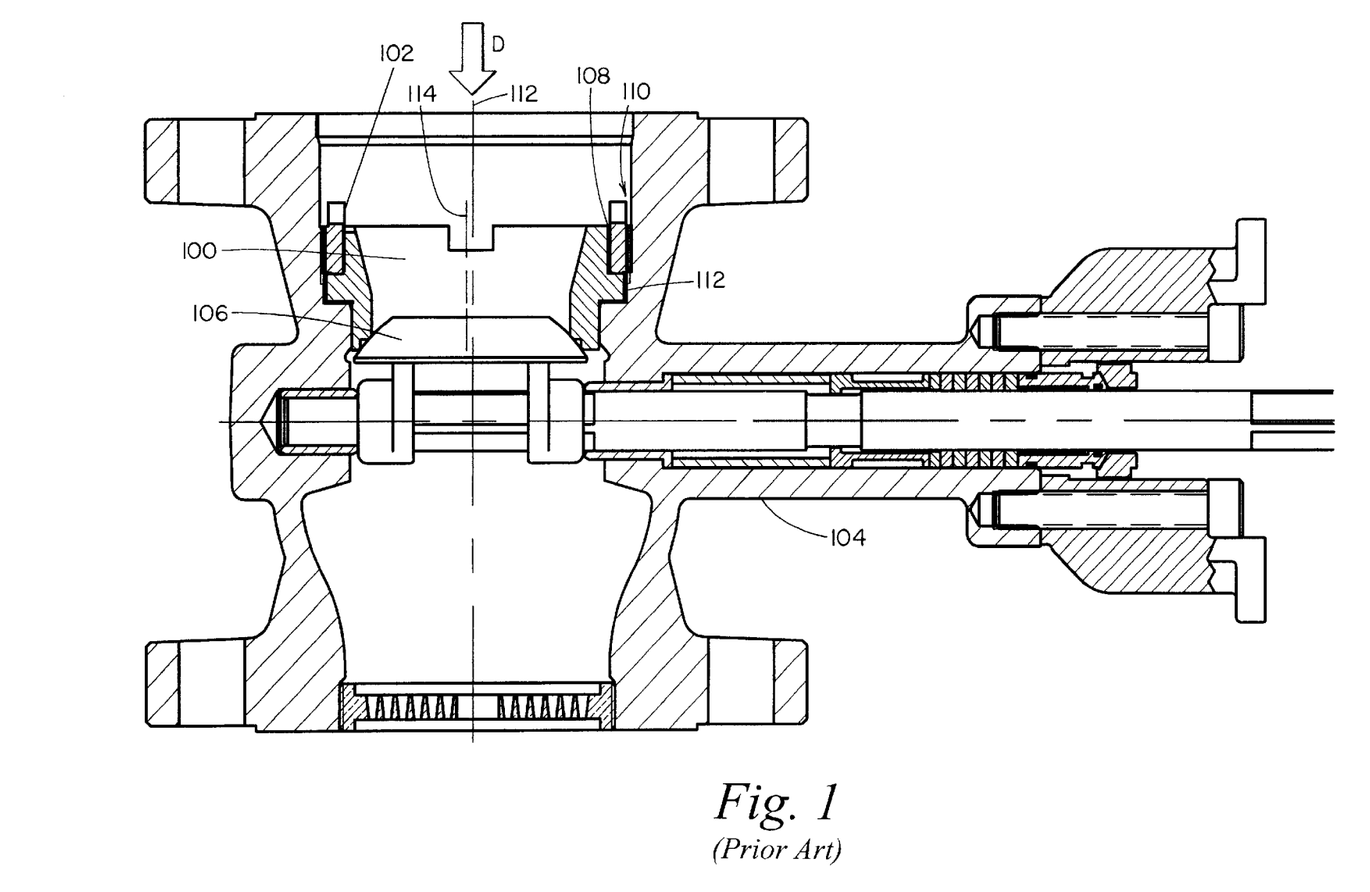
FIG. 1 is a diagrammatic illustration of a known eccentric rotary plug valve.

Alternatively, eccentric rotary plug control valves provide better accuracy over a broader range of flow rates. However, these control valves are not as sanitary as the sanitary butterfly valves. A typical eccentric rotary plug control valve is illustrated in FIG. 1. A valve body 104 houses an eccentric seat ring 100. The eccentric seat ring 100 is held in place with a retainer 102. A valve plug 106 is movable within the valve body 104 and presses against the eccentric seat ring 100 to close the valve. The eccentric seat ring 100 is made eccentric, as evidenced by the eccentric seat ring 100 maintaining a cylindrical portion having a central axis 114 which is offset from a central axis 116 of the entire seat ring 100. This offset is what defines the eccentric seat ring 100.

When the valve is assembled, the eccentric seat ring 100 is placed in its approximate position, but is allowed to rotate, changing the position of the seating surface until the eccentric seat ring 100 aligns with the valve plug 106. The eccentric seat ring 100 is then secured in place with the retainer 102.

If the eccentric seat ring 100, as described in this prior art example, were to be sealed, the attempted sealing would create crevices that would not be easily cleanable during standard cleaning processes. More specifically, with reference to FIG. 1, a first crevice 108 exists between the retainer 102 and the eccentric seat ring 100, a second crevice 110 exists between the retainer 102 and the valve body 104, and a third crevice 112 exists between the eccentric seat ring 100 and the valve body 104. Fluid flowing in the direction of arrow D flows through the eccentric seat ring 100 and the retainer 102, passing over the crevices 108 and 110. Arrow D represents the flow path of a process fluid, or a cleaning fluid, through the valve body 104. Some fluid will pass into each of the first crevice 108, the second crevice 110, and the third crevice 112, and is difficult to remove.

The additional crevices 108, 110, and 112 in the eccentric seat ring 100 example require three seals, and therefore three leak potential locations for failure and bacteria growth. O-rings utilized to seal the eccentric seat ring 100 in a location to block the crevices 108, 110, and 112 create possible pooling points between the components including the eccentric seat ring 100 in crevices 108, 110, and 112. Further, the arrangement including the eccentric seat ring 100 is difficult to match to pipes because the components do not combine to conform to a particular pipe dimension. This pipe size matching is important to prevent line gasket over hang and to reduce locations for bacteria growth.

Another variation of the valve is a concentric seat ring (not shown). When the valve is assembled, the seat ring is placed in its approximate position, but is allowed to move up, down, left and right in a sliding fashion until the seat ring aligns with the valve plug. The seat ring is then secured in place with a retainer. The concentric seat valve includes similar crevices to those found between the eccentric seat ring 100 and the valve body 104. However, the sealing ability of the concentric seat valve is even further challenged during installation and alignment. Instead of rotating an eccentric seat ring, the concentric seat ring slides up, down, left, and right, to align with the valve plug. Such movement will cause a variance in the percentage of squeeze which causes an O-ring type seal to lose sealing ability.

O-rings utilized to seal the concentric seat ring in a location to block the crevices are ineffective because the O-rings will not maintain a seal when the concentric seat ring moves during assembly and/or alignment. As the concentric seat ring moves, the O-ring will not maintain a consistent percentage of squeeze, thus losing its sealing abilities. Therefore, a consistent O-ring seal cannot be maintained or guaranteed at either the concentric seat ring body, or the seat ring retainer interface. Further, the retainer also requires sealing with a seal such as an O-ring.

Standard valve cleaning processes include the use of steam and/or caustic materials, which flow through the valves to clean them out on a periodic basis. Returning to the eccentric seat ring 100 example, the steam and the caustic materials have a difficult time penetrating the first crevice 108, the second crevice 110, and the third crevice 112. The inability to penetrate results in unsanitary conditions because the crevices 108, 110, and 112 are not sufficiently cleaned. Furthermore, the presence of the crevices may generate stagnation points in the process flow, which are undesirable and can lead to bacteria growth. Alternatively, if the caustic materials penetrate into the first crevice 108, the second crevice 110, and the third crevice 112, it is very difficult to rinse the caustic materials out of the crevices 108, 110, and 112. There is a significant likelihood that the caustic materials will remain in each of the crevices 108, 110, and 112. This can cause hazardous conditions for food subsequently flowing through the valve, which can pick up the caustic material and carry it through the process to the final destination, and ultimately to a consumer.

SUMMARY OF THE INVENTION

There is a need in the art for a sanitary eccentric seat ring for use with a rotary plug valve in systems requiring sanitary conditions. The sanitary eccentric seat ring supports the ability to properly seal the seat ring in a sanitary manner to facilitate cleaning. The present invention is directed toward further solutions to address this need.

In accordance with one example embodiment of the present invention, a seat ring includes a body having a first section, a second section, and a body central axis passing through the first and second sections. A first bore is disposed within the first section, and has a first bore central axis concentric with the body central axis. A second bore is disposed within the second section, and has a second bore central axis eccentric to the body central axis.

The seat ring, in accordance with several embodiments, includes the first section being generally frusto-conical in shape. The second section is generally cylindrical in shape. The first bore within the first section is generally frusto-conical in shape, while the second bore of the second section is generally cylindrical in shape.

The seat ring can further include a flange disposed at one end of the first section. The flange is suitable for mounting the seat ring in a valve body. The flange can further include a serrated surface disposed thereon for improving the sealing properties of the flange when joined with a gasket. The flanged end of the seat ring can be modified to work with other process piping connection means, such as flangeless, triclamp, or welded ends.

In accordance with one aspect of the present invention, at least one channel is provided about a periphery of the second section. The channel is sized and dimensioned to receive at least one seal, such as an O-ring.

The arrangement of the first bore and the second bore within the first section and second section creates a structure that forms a self draining seat ring in accordance with further aspects of the present invention.

In accordance with still another embodiment of the present invention, a seat ring assembly is provided. The assembly includes a seat ring disposed in a valve housing. The seat ring includes a body having an end flange, a first section, a second section, and a body central axis passing through the first and second sections. A first bore is disposed within the first section, and has a first bore central axis concentric with the body central axis, and a second bore is disposed within the second section, and has a second bore central axis eccentric to the body central axis. The assembly further includes a sealed disposed to sealingly engage an internal wall of the valve housing. At least one fastening mechanism can be disposed on the end flange that is suitable for removably and replaceably mounting the seat ring within the valve housing. The mounting of the seat ring can occur in a manner such that the at least one fastening mechanism is remote from a flow path through the seat ring.

In accordance with still another aspect of the present invention, a method is provided of installing a seat ring. The method includes inserting the seat ring into a valve body. The seat ring has at least one seal disposed to seal a gap between the seat ring and the valve body. The method continues with rotating the seat ring to adjust a central axis of an eccentric bore within the seat ring to align with a valve control element. The seat is removably and replacably fastened into the valve body with at least one fastening mechanism, such that the at least one fastening mechanism is removed from a flow path through the valve and the seat ring.

The at least one fastening mechanism can include a clip and screw combination in accordance with one aspect of the present invention. Further, the seal can take the form of an O-ring type seal disposed about a periphery of the seat ring.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION

An illustrative embodiment of the present invention relates to an eccentric sanitary seat ring for use with a plug valve. The seat ring is retained, in accordance with one embodiment, using any suitable fastening mechanism, such as clips and screws. Thus, there is no need for a retainer to hold the seat ring in place. The seat ring further includes a seal, such as an O-ring type seal, disposed about its periphery. Using the O-ring type seal, a seal is formed between the seat ring and the body of the valve to enable use of the valve and seat ring in sanitary (e.g., food and beverage, Bio-Pharmaceutical, and Bio-Technical) applications. The seat ring is further adjustable to make the valve easier to machine and assemble. Proper alignment of the seat ring is achieved by using the eccentricity (or offset) of the flow passage bore in relation to the seat ring outside diameter.

FIGS. 2 through 5, wherein like parts are designated by like reference numbers throughout, illustrate example embodiments of a seat ring and corresponding valve assemblies in accordance with the teachings of the present invention. Although the present invention will be described with reference to the example embodiments illustrated in the Figures, it should be understood that many alternative forms can embody the present invention. One of ordinary skill in the art will additionally appreciate different ways to alter the parameters of the embodiments disclosed, such as the size, shape, or type of elements or materials, in a manner still in keeping with the spirit and scope of the present invention. In addition, the teachings of the present invention can be utilized in conjunction with multiple different piping variations for use in conjunction with the seat ring of the present invention.

Figure 2:
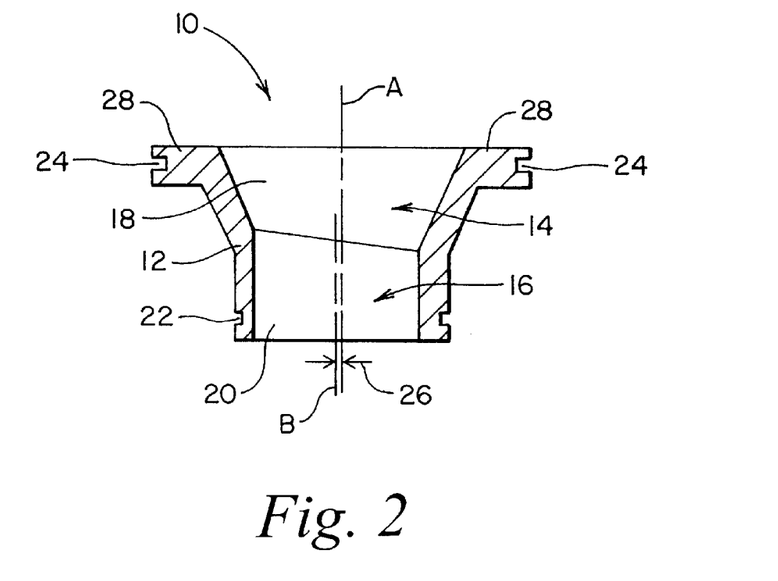
FIG. 2 is a diagrammatic cross-sectional view of a seat ring in accordance with one aspect of the present invention.

FIG. 2 shows a diagrammatic cross-sectional view of a seat ring 10 in accordance with one embodiment of the present invention. The seat ring 10 includes a body 12 having an upper section 14 and a lower section 16. The body can be made of a number of different materials, including metal, ceramic, plastic, or composite material.

The upper section 14 has a generally frusto-conical shaped bore 18. The frusto-conical shaped bore 18 in this embodiment is not a perfect frustrum because of a slightly inclined cutting plane causing an elliptical cross-section at the intersection with the lower section 16. The lower section 16 has a generally cylindrical shape and includes a cylindrical bore 20. The frusto-conical bore 18 shares a center line or central axis with a seat ring central axis A. The cylindrical bore 20 has a central axis B that is slightly offset from the seat ring central axis A. In other words, the cylindrical bore 20 is slightly eccentric to the outside circumference of the lower section 16, which is generally cylindrically shaped.

The body 12 of the seat ring 10 further includes a groove 22 that extends about a peripheral portion of the lower section 16. The groove is suitable for receiving a seal, such as an O-ring type seal, adapted for sealing engagement with a valve body.

The body 12 of the seat ring 10 also includes a flange 28 that has a recess 24 formed around a perimeter of the seat ring 10 within the flange 28. The size of the flange 28 is dependent upon type and size of end connection, as well as usage. The recess 24 is suitable for mounting the seat ring 10 within a valve body, as described further herein.

An offset distance 26 is shown in FIG. 2, and represents the difference between the seat ring central axis A and the cylindrical bore central axis B. This offset distance 26 is utilized when adjusting the seat ring 10 to align with a valve plug during installation within a valve body, as will be later described herein. Adjustment of the seat ring 10 by means of the offset cylindrical bore 20 allows the use of greater machining tolerances between the location of the shaft bore and the seat ring bore in a valve body.

Figure 3:
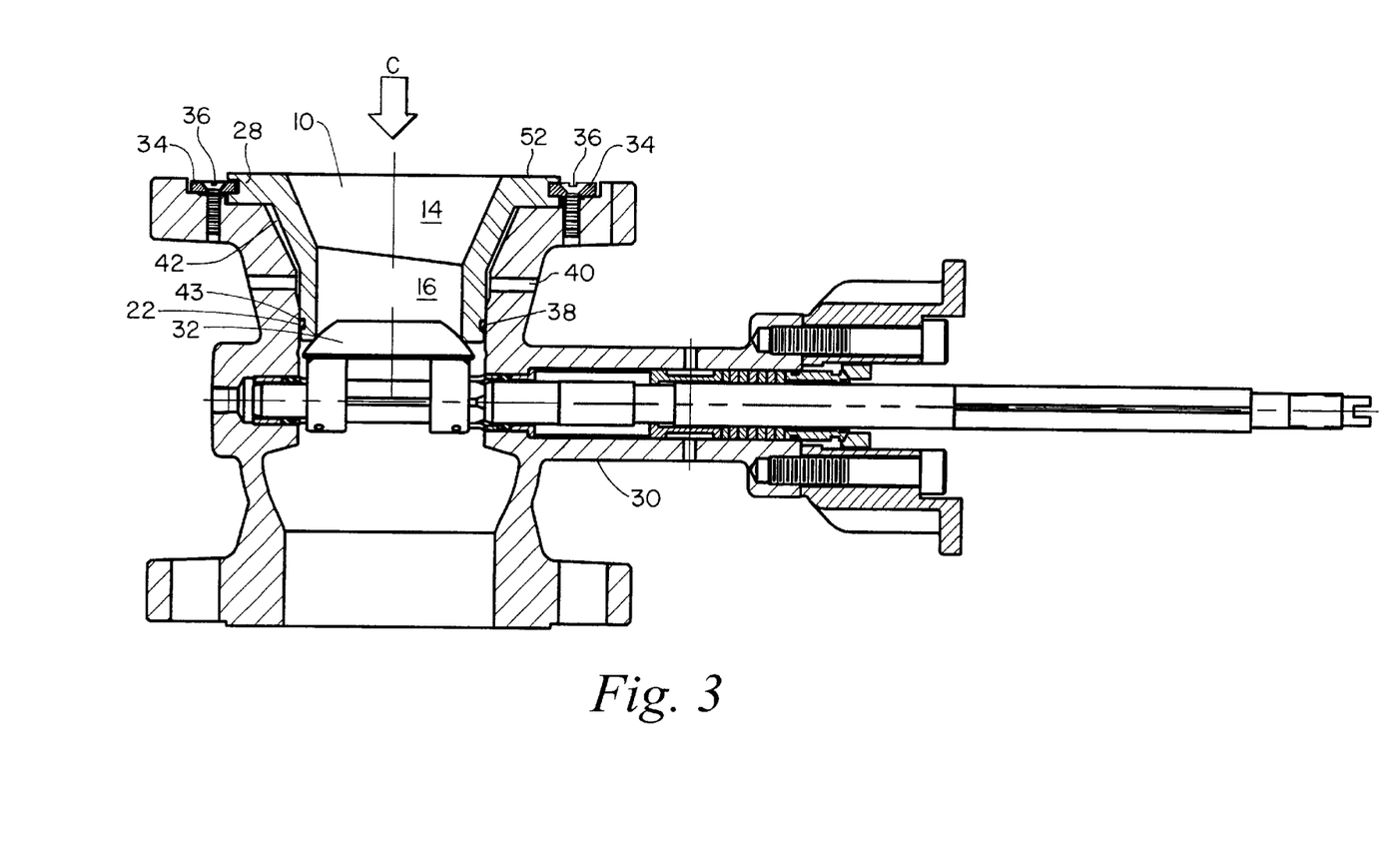
FIG. 3 is a diagrammatic cross-sectional view of a valve housing the seat ring in accordance with one aspect of the present invention.

FIG. 3 shows a diagrammatic cross-sectional view of a valve body 30 having the seat ring 10 installed therein. The direction of fluid flow is represented by the arrow C. Thus, the upper section 14 of the seat ring 10 is located at an upstream side of the flow and the lower section 16 is located at a downstream side of the flow. The valve body 30 further includes a valve plug 32 disposed therein to control the fluid flowing therethrough.

A fastening mechanism, such as a clip 34 operates in combination with another fastening mechanism, such as a screw 36 to secure the flange 28 to the valve body 30. The fastening mechanisms can be disposed at various locations around a perimeter of the flange 28 to mount the seat ring 10 in a removable and replaceable manner within the valve body 30. Other methods of mounting the seat ring 10 to the valve body 30 can be utilized. In addition, it should be noted that the methods of mounting the seat ring 10 can work in conjunction with different methods of connecting the valve body 30 with different pipes, such as using tri-clamps or welded ends. In each form of mounting, the seat ring 10 is held in place with the fastening mechanism to permit a wider range of sanitary applications without the requirement of a mating flange or retainer to hold the seat ring in place.

Referring again to FIG. 3, an overflow port 40 is provided in the valve body to expel any fluid that has leaked past a seal, such as the O-ring 38. Leakage and overflow should only occur in a situation of seal failure, and not during normal operating procedure. The overflow port 40 thus acts as an indicator of seal failure. A gap 42 exists between the seat ring 10 and the valve body to permit the seat ring 10 to freely rotate so that alignment and adjustment of the seat ring 10 within the valve body 30 can be accomplished.

The seat ring 10 can be installed in a number of different ways, including an example method of installation as described herein. In accordance with one embodiment, the seat ring 10 is first inserted into the valve body 30. The seat ring 10 maintains at least one seal (such as O-ring 38) disposed to seal a gap 43 between the seat ring 10 and internal walls of the valve body 30. The seal is disposed within the groove 22 about the perimeter of the seat ring 10. The seat ring 10 is then rotated to adjust the position of the cylindrical bore central axis B (see FIG. 2) within the seat ring 10 to align the cylindrical bore 20 with a valve control element, such as the valve plug 32. The seat ring 10 is then removably and replacably fastened to the valve body 30 with at least one or more fastening mechanisms (e.g. the clip 34 and the screw 36). The fastening mechanism is isolated from a flow path through the valve body 30 and the seat ring 10. Therefore, the fastening mechanism cannot interfere with, or compromise, sanitary conditions within the valve body 30.

Figure 4:
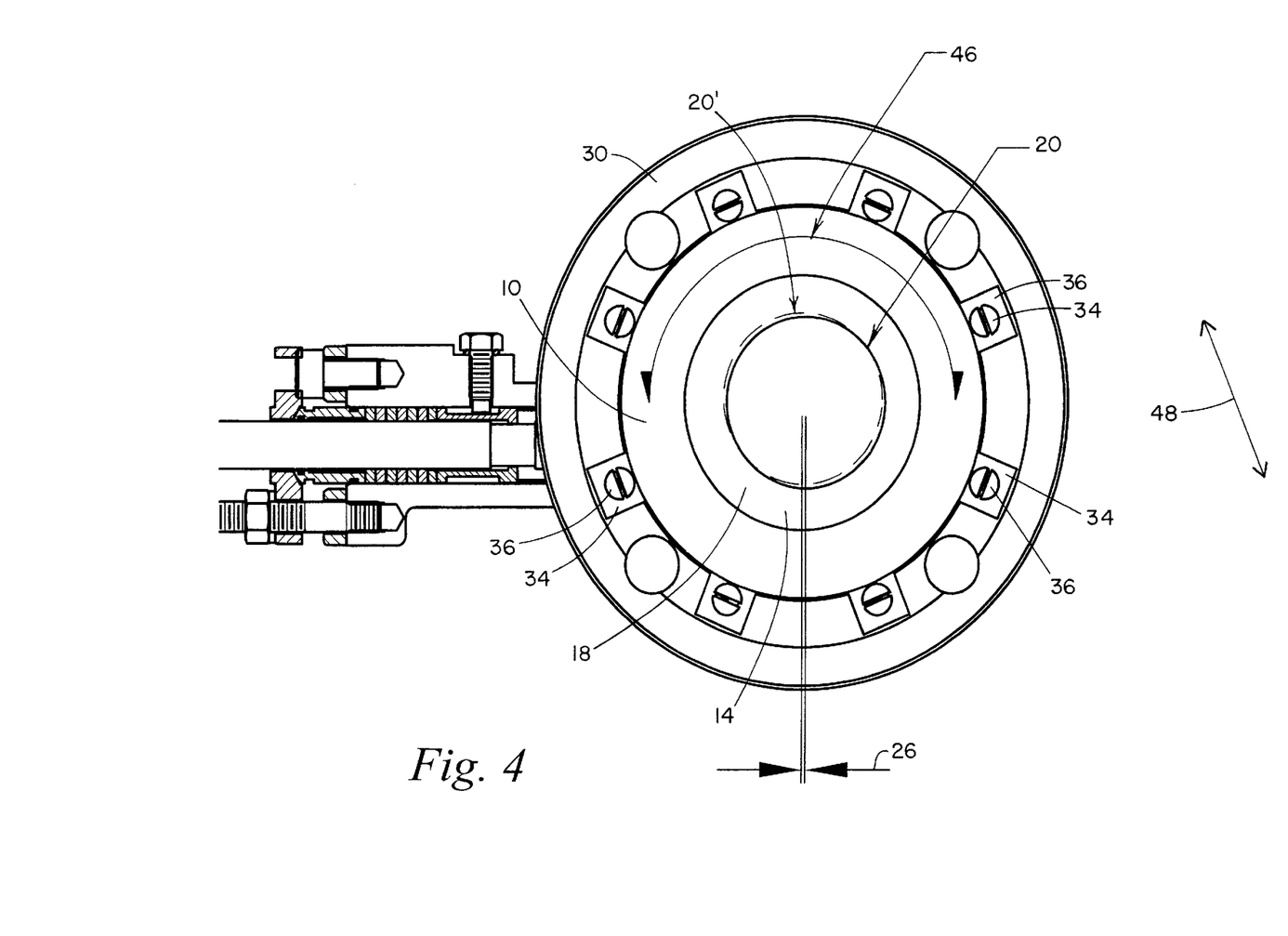
FIG. 4 is a diagrammatic cross-sectional view of the valve of FIG. 3, as viewed from above the valve in accordance with one aspect of the present invention.

FIG. 4 further illustrates the adjustment of the seat ring 10 by rotation to control the position of the eccentric cylindrical bore 20 relative to the valve plug 32 (see FIG. 3). Adjustment of the seat ring 10 is achieved by turning the seat ring 10 in the clockwise or counter clockwise direction as indicated by the arrow 46. Because the cylindrical bore 20 is offset relative to the frusto-conical bore 18 and to the outer perimeter of the upper section 14 and lower section 16, the cylindrical bore 20 can be repositioned in the direction of arrow 48 to a new position as illustrated by cylindrical bore 20'.

An example three inch seat ring was constructed in accordance with the teachings of the present invention. The three inch seat ring was rotated approximately five degrees. The seat of the cylindrical bore 20 moved in a vertical direction as represented in FIG. 4 about 0.1 inches and in a horizontal direction about 0.004 inches. Typically, the maximum rotation necessary for such an example seat ring is about twenty-five degrees for 0.49 inch vertical movement, and 0.11 inch horizontal movement. It should be noted that these are merely example measurements of one embodiment of a seat ring made in accordance with the teachings of the present invention. This example is not intended to limit the parameters, performance, or dimensions of seat rings made in accordance with the teachings of the present invention.

The ability of the cylindrical bore 20, and hence the seat ring 10, to rotationally move within the valve body 30, allows for greater machining tolerances in the distance between the shaft center and the center of the cylindrical bore 20 as illustrated by the offset 26.

The translation of the cylindrical bore 20 is a function of the size of the offset 26 between the cylindrical bore 20 and the exterior perimeter of the seat ring 10 in conjunction with the amount of rotation of the seat ring 10. With rotation of the seat ring 10, the cylindrical bore 20 moves to the offset position of cylindrical bore 20' and then returns to the original position of cylindrical bore 20 as illustrated in FIG. 4. The cylindrical bore 20' as illustrated is in a position 90 degrees rotated from a starting position.

It should be reiterated that only the cylindrical bore 20 is offset eccentrically to the exterior of the seat ring 10, while the frusto-conical bore 18 is concentric with the exterior of the seat ring 10. Therefore, the cone of the frusto-conical bore 18 is always aligned with a pipe or other instrument aligned with the valve body 30 to minimize gasket overhang and maintain alignment.

With the inventive embodiments of the present invention, when the seat ring 10 is adjusted by rotation rather than sliding, the O-ring 38 (see FIG. 3) can effectively seal the periphery of the seat ring 10 within the valve body. The rotation of the seat ring 10 either rotates the O-ring 38 as well, and/or allows some slippage between the O-ring 38 and the grove 22. In either event, the O-ring 38 maintains a consistent percentage squeeze, therefore the adjustment method maintains seal integrity.

The location of the O-ring 38 minimizes interferences along the flow path. This enables proper cleaning of the valve and prevents fluids and other material, such as bacteria, from being trapped in spaces around each of the parts as in the previously described prior art.

In addition, the one piece design of the seat ring 10 provides a sanitary assembly, eliminating crevices in the flow path of fluid flowing through the valve body 30 and seat ring 10. The cone shape of the frusto-conical bore 18 of the interior of the seat ring 10 allows for self draining when the valve body 30 is properly installed in a vertical pipeline, which is customary for such a device. In the vertical position, any fluid flowing through the seat ring 10 flows along the frusto-conical bore 18 and down through the cylindrical bore 20 continuing through the valve body. The fluid does not get caught in any angled or crevice locations, nor does it pool on any horizontal surface locations.

In addition, the conical angle of the frusto-conical bore 18 leading into the seat ring 10 allows for continuity among full and reduced port designs as needed. Further, the frusto-conical shape of the seat ring 10 inlet can be machined to match any number of pipe styles.

The clip 34 and screw 36 combination, as described herein, holds the seat ring 10 in place for calibration and shipment. This retention method does not contact the process media, and therefore increases the sanitary quality of the seat ring 10 and the valve in which it is installed. Once the seat ring 10 is positioned, a mating flange holds the seat ring in place in addition to the clip 34 and screw 36 combination. The flange 28 can further include a serration 52 thereon to improve sealing properties with a gasket between the flange 28 and a mating flange when installed. The serration 52 improves the sealing qualities as is known by one of ordinary skill in the art.

Figure 5:
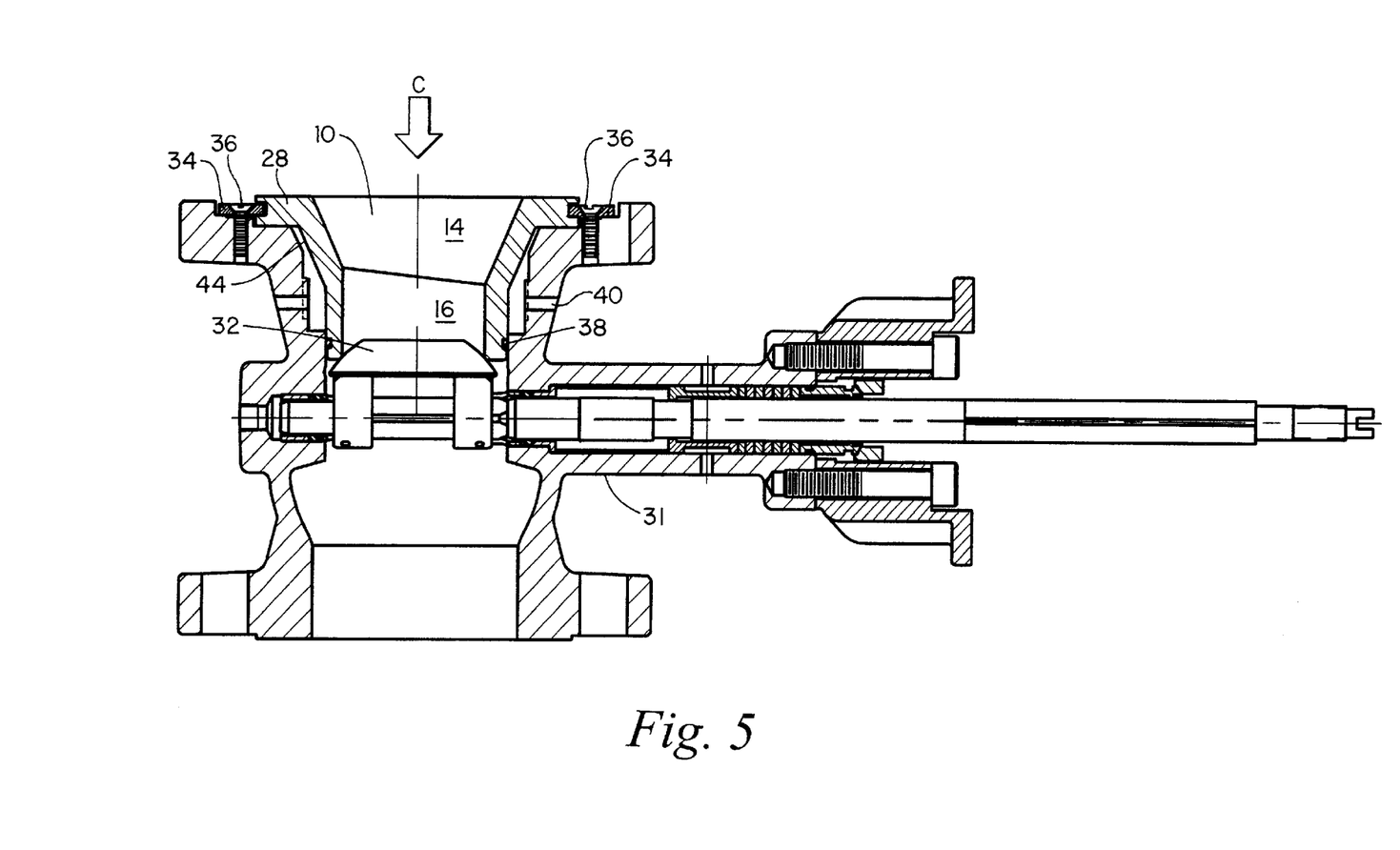
FIG. 5 is a diagrammatic cross-sectional view of another valve housing the seat ring in accordance with one aspect of the present invention.

FIG. 5 is a diagrammatic cross-sectional view of the seat ring 10 retrofitted into an existing valve body 31, which previously required a seat ring and retainer assembly as in prior art FIG. 1. This illustration shows that the seat ring 10 can be utilized in existing valves without major modifications to the valve body. The seat ring 10 sits within the valve body 31 as before, and is held in place with the clip 34 and screw 36 combinations about a periphery of the seat ring 10 along the flange 28. A larger gap 44 exists between the walls of the seat ring 10 and the interior walls of the valve body 31. However, this gap 44 does not impact on the operation of the seat ring 10 and the valve in which it is installed. As is illustrated herein, the O-ring 38 seals the gap 44 from the flow path along the direction of arrow C through the seat ring 10 and the valve body 31. Thus, the size of the gap 44 has no perceptible effect on the operation of the valve.

The eccentric seat ring 10 in accordance with the present invention provides a sanitary mechanism for use with a plug-type control valve. The seat ring 10 maintains a self-draining interior cavity, and an offset cylindrical portion for seating with a valve plug. Adjustment of the seat ring 10 occurs with mere rotation of the seat ring 10 within the valve housing, which moves the eccentric portion of the interior cavity to align with the valve plug. The one-piece design of the seat ring 10 in accordance with the present invention is suitable for new installations, or retrofits of prior existing installations. An end flange enables the mounting of the seat ring within a valve without corresponding fastening mechanisms interfering with the flow path through the valve. Therefore, sanitary features of the seat ring 10 and valve are maintained.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. It is intended that the present invention be limited only to the extent required by the appended claims and the applicable rules of law.

What is claimed is:

1. A seat ring, comprising:
    a body having a first section, a second section, and a body central axis passing through said first and second sections;
    a first bore formed within said first section, and having a first bore central axis concentric with said body central axis; and
    a second bore disposed within said second section, and having a second bore central axis eccentric to said body central axis.

2. The seat ring according to claim 1, wherein said first section is generally frusto-conical in shape.

3. The seat ring according to claim 1, wherein said second section is generally cylindrical in shape.

4. The seat ring according to claim 1, wherein said first bore is generally frusto-conical in shape.

5. The seat ring according to claim 1, wherein said second bore is generally cylindrical in shape.

6. The seat ring according to claim 1, further comprising a flange disposed at an end of the first section and suitable for mounting said seat ring in a valve body.

7. The seat ring according to claim 6, further comprising a serrated surface disposed on said flange for sealingly joining said flange of said seat ring.

8. The seat ring according to claim 1, wherein the body is manufactured of a material from the group consisting of metal, ceramic, plastic, and composite.

9. The seat ring according to claim 1, further comprising at least one channel for receiving at least one sealing device, said channel disposed about a periphery of said second section.

10. The seat ring according to claim 9, wherein said sealing device comprises an O-ring type seal.

11. The seat ring according to claim 1, wherein said first bore and said second bore form a self-draining structure.

12. A seat ring assembly, comprising:
    a seat ring disposed in a valve housing and comprising:
        a body having an end flange, a first section, a second section, and a body central axis passing through said first and second sections;
        a first bore disposed within said first section, and having a first bore central axis concentric with said body central axis; and
        a second bore disposed within said second section, and having a second bore central axis eccentric to said body central axis;
    a seal disposed to sealingly engage an internal wall of said valve housing; and
    at least one fastening mechanism disposed on said end flange and suitable for removably and replaceably mounting said seat ring within said valve housing in a manner such that said at least one fastening mechanism is isolated from a flow path through said seat ring.

13. The assembly according to claim 12, wherein said first bore and said second bore form a self-draining structure.

14. The assembly according to claim 12, wherein said at least one fastening mechanism comprises a clip and screw combination.

15. The assembly according to claim 12, wherein said seal is an O-ring type seal disposed about a periphery of said seat ring.

16. The assembly according to claim 12, further comprising a serrated surface disposed on said end flange suitable for sealing engagement during installation of the valve housing.

17. A method of installing a seat ring, comprising:

inserting said seat ring into a valve body, said seat ring having at least one seal disposed to seal a gap between said seat ring and said valve body;

rotating said seat ring to adjust a central axis of an eccentric bore within said seat ring to align with a valve control element; and removably and replaceably fastening said seat ring into said valve body with at least one fastening mechanism, such that said at least one fastening mechanism is remote from a flow path through said valve and said seat ring.

18. The method according to claim 17, wherein said seat ring comprises:

a body having a first section, a second section, and a body central axis passing through said first and second sections;

a first bore disposed within said second section, and having a first bore central axis concentric with said body central axis; and a second bore disposed within said second section forming said eccentric bore, and having a second bore central axis that is eccentric relative to said body central axis.

19. The method according to claim 17, wherein said at least one seal comprises an O-ring type seal.

20. The method according to claim 17, wherein said valve control element comprises a valve plug.

21. The method according to claim 17, wherein said at least one fastening mechanism comprises a clip and screw combination.

* * * * *